United States Patent
Chatterjee

(10) Patent No.: US 7,080,286 B2
(45) Date of Patent: Jul. 18, 2006

(54) HANDLING OVERSIZED RINGS THROUGH RECURSIVE CALLS

(75) Inventor: Anirban Chatterjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 10/002,466

(22) Filed: Nov. 1, 2001

(65) Prior Publication Data

US 2003/0084378 A1    May 1, 2003

(51) Int. Cl.
*G06F 11/00*    (2006.01)
(52) U.S. Cl. .......................... 714/37; 714/15
(58) Field of Classification Search ............ 714/37, 714/15

See application file for complete search history.

(56) References Cited

U.S. PATENT DOCUMENTS

| | | | | |
|---|---|---|---|---|
| 5,335,341 A | * | 8/1994 | Chana | 714/37 |
| 5,543,010 A | * | 8/1996 | Keng | 156/285 |
| 6,067,407 A | * | 5/2000 | Wadsworth et al. | 709/224 |
| 6,430,707 B1 | * | 8/2002 | Matthews et al. | 714/37 |
| 6,681,348 B1 | * | 1/2004 | Vachon | 714/45 |
| 2003/0056144 A1 | * | 3/2003 | Itoh et al. | 714/15 |

* cited by examiner

*Primary Examiner*—Bryce P. Bonzo
(74) *Attorney, Agent, or Firm*—Duke W. Yee; Mark E. McBurney; Betty Formby

(57) ABSTRACT

Certain elements in the scan dump performed at system failure have become so large that a header field which indicates the size of the element is itself too small. Rather than increase the size of the field, affecting numerous other programs, the elements are broken down into smaller pieces by the write routine, which can recursively call itself.

14 Claims, 2 Drawing Sheets

HANDLING OVERSIZED RINGS THROUGH RECURSIVE CALLS

BACKGROUND OF THE INVENTION

1. Technical Field

The present invention relates generally to handling computer system errors, and in particular to handling the scan data which is created after a system error. Still more particularly, the present invention provides an algorithm, method and apparatus for handling elements of the scan data, such as scan rings or trace arrays, whose size exceeds a given maximum size.

2. Description of Related Art

The ability to recover from computer system errors and to detect failing components is crucial to continued operation of the system. Diagnostic codes produced by the operating system can indicate the general area of a problem, but are not always capable of clarifying the exact nature of the problem. While real-time monitoring of internal computer processes is not possible, a "snapshot" of system data can provide critical insights into the process. Therefore, when system errors happen, selected chip data is saved to a portion of memory that is persistent, i.e., retains the data when power to the chip fails. This data can include register contents and critical storage areas, such as scan rings and trace array data created by low level system programs, all of which is saved for analysis. The process of saving this data is called a scan dump, and the data is called scan data.

When a system error is recognized in a computer system, a scan dump routine is invoked. This scan dump routine will create a list of elements to be saved, then proceed through the list. For each element to be saved, a write dump routine in invoked to write the element to non-volatile storage. A header that provides information about the element is also written. Later, when the system has been rebooted, the operating system will retrieve the data so that it can be analyzed.

The header which is produced by the write dump routine is 16 bytes long, with a two byte field giving the size of the scan data element. This limits the maximum size of the element which can be handled to only 64 kB. Several of the elements in the dump, specifically some of the rings which are created by the system, have grown beyond the maximum allowable size, requiring some modification to the program(s) handling this data.

While it is possible to allocate more than two bytes to give the size of a scan data element, enlarging this field would necessitate rewriting portions of numerous programs in different functional areas of the operating system. Moreover, unless the size field is enlarged more than currently necessary, the need for further modification to the programs could be triggered by future increases in size of the elements. Thus, it would be desirable to provide a method of handling these large elements such that future programming changes will not be needed.

SUMMARY OF THE INVENTION

In order to handle larger dump elements, the present invention adds a smart algorithm to the write dump routine. This algorithm breaks the data element into several smaller data blocks, each of which are 64 kB or less in size. To accomplish this goal, the routine utilizes recursive calls to itself, so that iterations writing 64 kB blocks continue as long as necessary. This algorithm enables the routine to handle any size of scan data element. Even if ring sizes continue to grow, no code needs to be rewritten in this program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
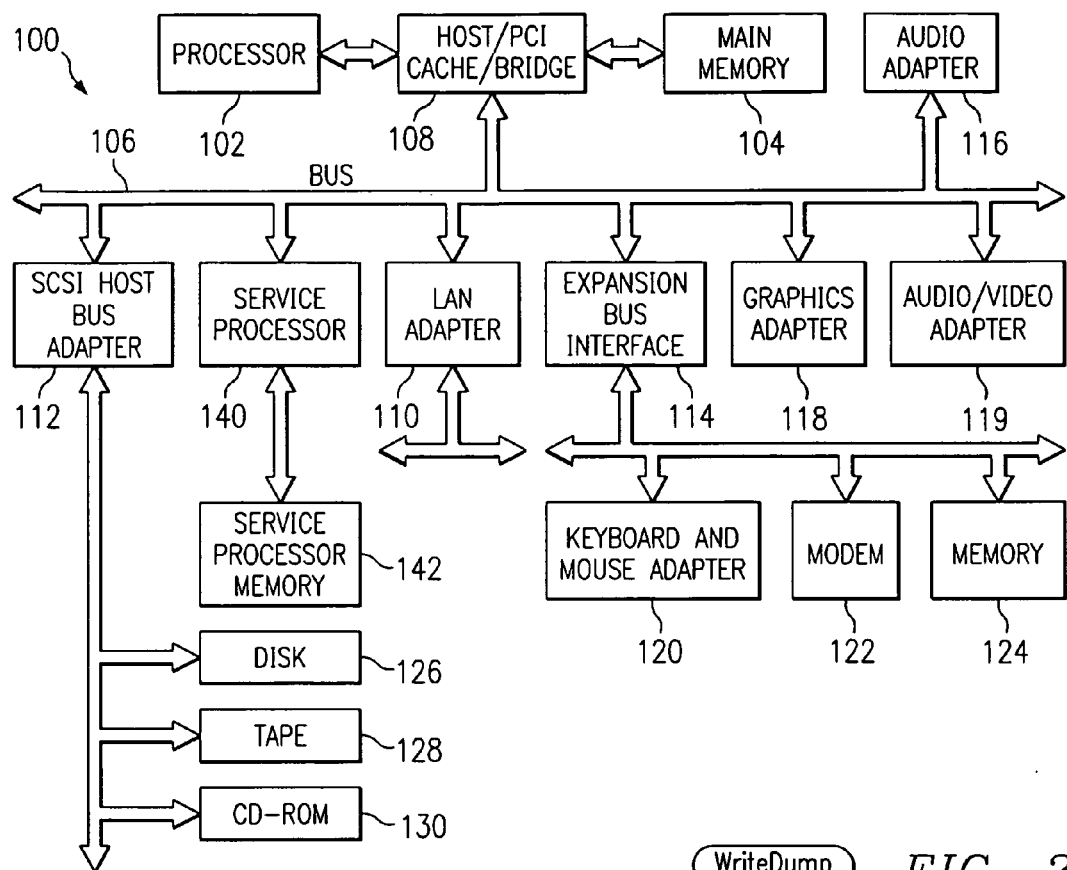
FIG. 1 is a block diagram of a data processing system in accordance with an exemplary embodiment of the invention.

With reference now to the figures and in particular with reference to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows 2000, which is available from Microsoft Corporation. Service processor 140 runs alongside processor 100 and monitors processor 100 for errors. When fatal errors occur, service processor 140 does error logging and produces a scan dump. Service processor 140 has its own dedicated memory 142, at least some of which is non-volatile memory.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

When invoked, the scan dump routine and its called routines run in service processor 140. These routines write out the contents of the main processor 102, as well as portions of cache memory, the memory controller, memory interfaces, input/output hubs, etc. to the nonvolatile memory 142 associated with service processor 140.

Figure 2:
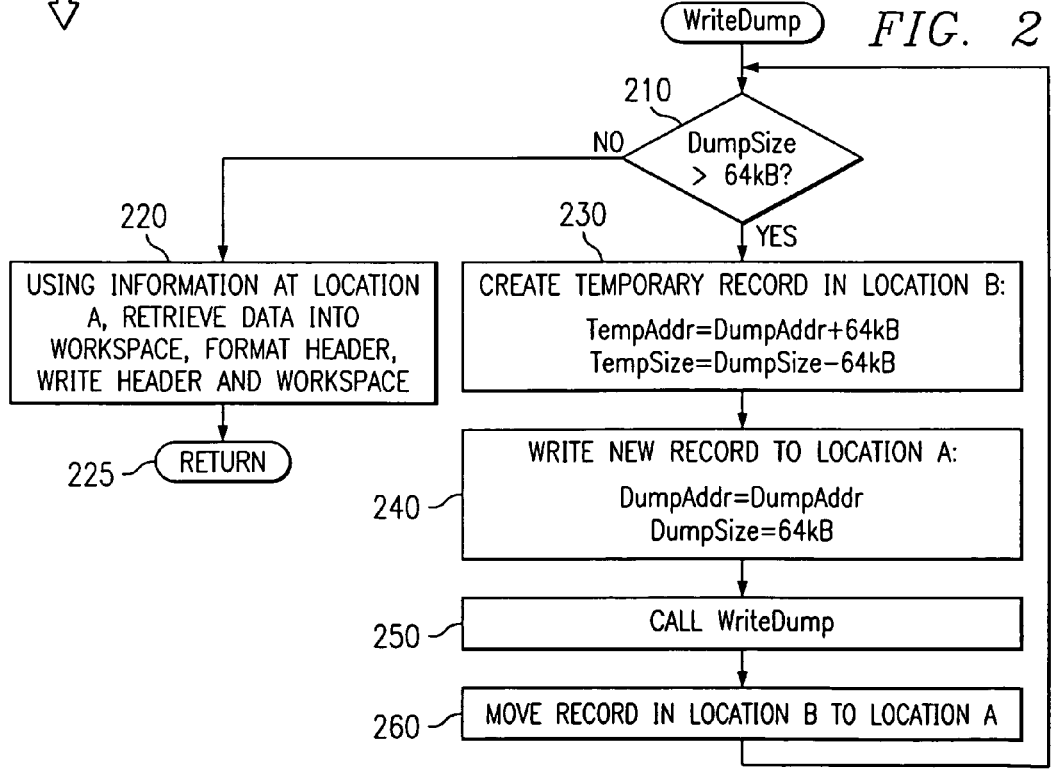
FIG. 2 is a flowchart of the routine which formats and writes the scan data according to an exemplary embodiment of the invention.
Figure 3:
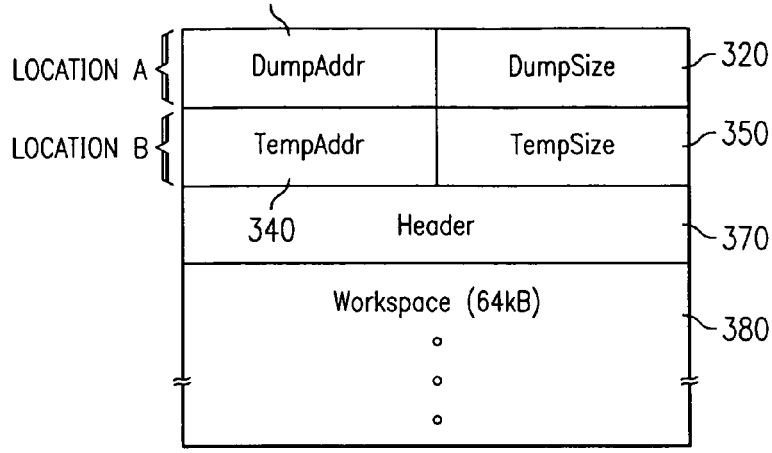
FIG. 3 is a diagram of the workspace used by the routine according to an exemplary embodiment of the invention.

Referring now to FIG. 2, this figure shows a flowchart of a computer routine in accordance with an exemplary embodiment of the disclosed invention. The flowchart will be discussed with reference to FIG. 3, an example of the workspace used by the routine in accordance with a preferred embodiment of the present invention. It will be understood that this is only one specific implementation of the inventive idea, which can be modified in numerous ways. The routine WriteDump is originally called by the scan dump routine to format and write a dump element to the operating system (OS). The element can be a scan ring, a trace array, or any other element which forms part of the dump. In this embodiment, the maximum size of the element written by WriteDump is 64 kB, as the size field in the header is only two bytes, as noted earlier. However, the inventive concept is not limited to this single embodiment, and can be used in other systems which have a different limit on the size of elements. At the time WriteDump is called, at least two fields are passed to it at location A: the address (DumpAddr) 310 where the current element of the dump starts and the size (DumpSize) 320 of the dump element. For the sake of this explanation, assume that the value of DumpAddr 310 is xyz, where xyz is an actual address and the value of DumpSize 320 is 70 kB, too large to be written as a single record. In step 210, DumpSize 320 is checked. If the value is less than or equal to 64 kB, the routine executes in the same manner as previously, passing to step 220, which will be discussed later.

Since, in this example, DumpSize 320 is 70 kB, which is greater than the 64 kB maximum size, the flow moves to step 230. In step 230, a temporary record is created at location B, so that location A can be used in a recursive call. In this temporary record, the value xyz of DumpAddr is incremented to xyz+64 kB, while the value of DumpSize is decremented by 64 kB to a value of 6 kB. In effect, this temporary record describes the data element remaining after the first 64 kB are written. In step 240, the record at location A is modified to have a DumpSize 320 of 64 kB, with DumpAddr 310 remaining equal to xyz, its previous address. Step 250 shows the routine making a recursive call to itself, so that the routine is entered again at the beginning. In this recursive call, the routine will process the record in location A, which has a DumpSize field with a value of 64 kB. Because the record in location A now passes the size test, step 220 is executed. The first 64 kB of information at location xyz is retrieved into workspace 380, a suitable header 370 is created, and both are written to storage. Step 225 then returns control to the calling routine. Since this was a recursive call, control is returned to the point immediately after the recursive call, which is step 260. Step 260 moves the information in location B to location A, so that location A indicates the remainder of the element to be written, then the flow goes to step 310. When DumpSize is checked in step 310, it is now 6 kB, which passes the size test, so this record is now written in step 320 as it was formerly. However, note that if the remaining portions of the element were still larger than 64 kB, steps 230–260 would be performed again as necessary until the remaining portion passes the size test. In this example, when the second, 6 kB record is written, step 225 returns control back to the original calling routine. It will be understood that WriteDump will be called by the scan dump routine numerous times to write each of the elements necessary to be saved. Only when an element is larger than 64 kB are the recursive calls necessary.

Figure 4:
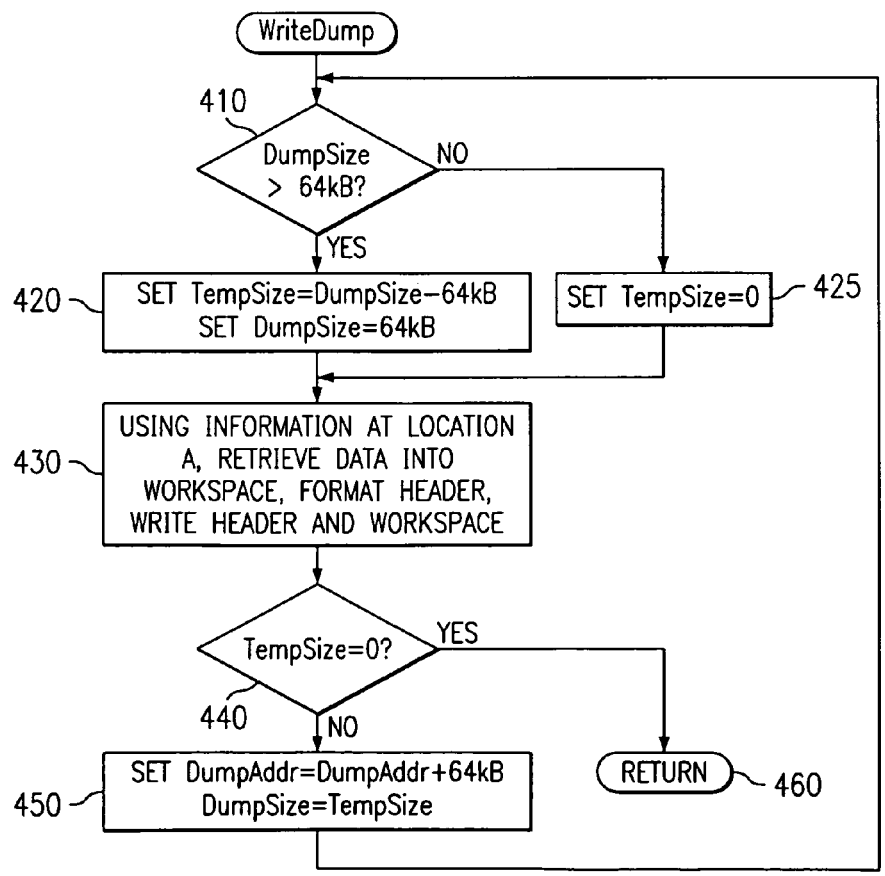
FIG. 4 is a flowchart of the routine which formats and writes the scan data according to an alternate exemplary embodiment of the invention.

With reference now to FIG. 4, it is possible, in an alternate embodiment, to perform the same steps without recursive calls to the routine. Rather, in this embodiment, the WriteDump routine loops back within itself to write the necessary number of records for each element, then returns control to the calling routine.

In this embodiment, as in the previous embodiment, the first step, 410, checks the value of DumpSize 320. If DumpSize 320 is greater than 64 kB, then field TempSize 350 is set to the value of DumpSize 320 and Dumpsize 320 is set to 64 kB (step 420), otherwise TempSize 350 is set to zero (step 425) to indicate that the record is within the maximum size.

Step 430 uses the information stored in Location A to retrieve the element or portion of an element defined by DumpAddr 310 and DumpSize 320 into Workspace 380. Header 370 is created and both header 370 and workspace 380 are written. Step 440 checks the value of TempSize 420, which was set earlier in the routine. If TempSize 420 equals zero, the entire element has now been written, so control goes to step 460, which returns to the calling routine. If TempSize 350 is not zero, it contains the size of the remaining portion of the element which must still be written. In this event, step 450 is performed, where DumpAddr 310 is incremented by 64 kB to point to the remaining portion of the element, while DumpSize 320 is set to the value of TempSize 350, followed by a return to step 410 for processing of the remainder of the element.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

For example, the routine which executes the disclosed algorithm is described as executing in the service processor. However, it can execute in main memory or in another processor.

What is claimed is:

1. A computer program product in a computer readable medium containing a routine for writing a dump element, the routine comprising the steps of:
    first instructions for checking a size of a current dump element against a threshold,
    second instructions, if the size is greater than said threshold, for
        formatting a first portion of the dump element which is the size of the threshold,
        writing said first portion of the dump element,
        setting the remaining portion of the dump element to be a new dump element and returning to the checking step;
    third instructions, if the size is less than or equal to said threshold, for
        formatting the dump element,
        writing said the dump element, and
        returning to a calling routine.

2. The computer program product of claim 1, wherein said threshold is 64 kB.

3. The computer program product of claim 1, wherein said routine performs recursive calls.

4. The computer program product of claim 1, further comprising, whenever the dump element or portion of the dump element are formatted and written, formatting and writing a header for the dump element.

5. A method for writing a dump element, the method comprising the steps of:
    receiving parameters for the dump element including a first starting address and a first size parameter;
    if said first size parameter is not greater than a given threshold, then
        formatting said element,
        writing said element, then returning to a calling routine,
    if said first size parameter is greater than or equal to said given threshold, then
        setting a second starting address equal to said first starting address plus said threshold,
        setting a second size parameter equal to said first size parameter minus said threshold,
        setting said first size parameter to said threshold,
        calling said method recursively, and
        after said calling step, setting said first size parameter to said second size parameter, setting said first starting address to said second starting address, and going to said receiving step.

6. The method of claim 5, wherein said threshold is 64 kB.

7. The method of claim 5, further comprising formatting and writing a header for said dump element.

8. A computer system comprising:
    a processor which is connected to receive input from at least a first device and to provide output through at least a second device, said processor being programmed to invoke, at the time of a system error, a routine which performs the following steps:
    receiving parameters for the dump element including a first starting address and a first size parameter;
    if said first size parameter is not greater than a given threshold, then
        formatting said element and a header describing said element,
        writing said element and said header, then returning to a calling routine,
    else,
        setting a second starting address equal to said first starting address plus said threshold,
        setting a second size parameter equal to said first size parameter minus said threshold,
        setting said first size parameter to said threshold,
        calling said routine recursively, and
        after said calling step, setting said first size parameter to said second size parameter, setting said first starting address to said second starting address, and going to said receiving step.

9. The computer system of claim 8, wherein said threshold is 64 kB.

10. The computer system of claim 8, wherein said routine writes data to nonvolatile memory.

11. The computer system of claim 8, further comprising writing a header each time a dump element or a portion of a dump element is written.

12. A computer system comprising:
    means to receive information regarding a scan dump element to be written;
    means to check the size of the scan dump element; and
    means to write a given block of data which is of a given size or less;
    means to modify said information regarding the scan dump element;
    wherein if the size of said scan dump element is not greater than said given size, said means to write is configured to write said scan dump element to nonvolatile memory, otherwise said means to write is configured to write a first portion of said scan dump element which is of said given size to nonvolatile memory, said means to modify is configured to modify said information to indicate the remaining portion of said element as a new element and to performs said wherein step again.

13. The computer system of claim 12, wherein said given size is 64 kB.

14. The computer system of claim 13, wherein said means to write is also configured to write a header for each portion of an element which is written.

* * * * *